(12) United States Patent
Hara et al.

(10) Patent No.: US 10,465,733 B2
(45) Date of Patent: Nov. 5, 2019

(54) ENCASED NUT

(71) Applicants: AOYAMA SEISAKUSHO CO., LTD., Niwa-Gun (JP); TOYOTA JIDOSHA KABUSHIKI KAISHA, Toyota-Shi (JP)

(72) Inventors: Mototsugu Hara, Nissin (JP); Yoshihiro Murase, Niwa-Gun (JP); Yukinori Fujimoto, Niwa-Gun (JP); Hiroyasu Ichikawa, Niwa-Gun (JP); Katsuhisa Katoh, Niwa-Gun (JP); Ryuji Utsuno, Niwa-Gun (JP); Takahiro Seko, Niwa-Gun (JP)

(73) Assignees: Aoyama Seisakusho Co., Ltd., Niwa-Gun (JP); Toyota Jidosha Kabushiki Kaisha, Toyota-Shi (JP)

( * ) Notice: Subject to any disclaimer, the term of this patent is extended or adjusted under 35 U.S.C. 154(b) by 192 days.

(21) Appl. No.: 15/527,519

(22) PCT Filed: Mar. 11, 2016

(86) PCT No.: PCT/JP2016/057760
§ 371 (c)(1),
(2) Date: May 17, 2017

(87) PCT Pub. No.: WO2016/185773
PCT Pub. Date: Nov. 24, 2016

(65) Prior Publication Data
US 2019/0170179 A1     Jun. 6, 2019

(30) Foreign Application Priority Data
May 19, 2015   (JP) ................................. 2015-101601

(51) Int. Cl.
*F16B 39/284*      (2006.01)
*F16B 33/00*       (2006.01)
(Continued)

(52) U.S. Cl.
CPC .......... *F16B 33/008* (2013.01); *F16B 5/0225* (2013.01); *F16B 37/04* (2013.01); *F16B 37/044* (2013.01)

(58) Field of Classification Search
CPC ............................... F16B 33/008; F16B 37/04
(Continued)

(56) References Cited

U.S. PATENT DOCUMENTS 4,348,140 A  *  9/1982  Bergholz ............... F16B 5/0208
                                                         403/408.1
4,741,582 A  *  5/1988  Peroni ................... F16B 37/046
                                                         312/257.1

(Continued)

FOREIGN PATENT DOCUMENTS

CN       100549438 C     10/2009
JP       56-148116 U1    11/1981
(Continued)

OTHER PUBLICATIONS

International Search Report and Written Opinion (Application No. PCT/JP2016/057760) dated May 17, 2016.
(Continued)

*Primary Examiner* — Gary W Estremsky
(74) *Attorney, Agent, or Firm* — Burr & Brown, PLLC

(57) ABSTRACT

The nut of the present invention is an encased nut including: a case body which is welded to a body; and a nut which is freely movably held inside the case body. The nut is composed of a hexagonal nut body and an insulating member made of a resin and insert-molded on the outer surface of this hexagonal nut body. The insulating member is provided with a plurality of protrusions on the side, abutting on the body, of the outer circumferential part. The nut is insulated, and thus is not affixed by electrodeposition coating.

4 Claims, 6 Drawing Sheets

(51) Int. Cl.
*F16B 5/02* (2006.01)
*F16B 37/04* (2006.01)

(58) Field of Classification Search
USPC .......................................................... 411/111
See application file for complete search history.

(56) References Cited

U.S. PATENT DOCUMENTS

| | | | | |
|---|---|---|---|---|
| 5,078,537 | A * | 1/1992 | Nomura | F16B 37/046 403/21 |
| 5,096,350 | A | 3/1992 | Peterson | |
| 6,062,764 | A * | 5/2000 | Rixen | F16B 37/046 403/22 |
| 6,979,158 | B2 * | 12/2005 | Clinch | F16B 37/044 411/111 |
| 7,255,521 | B2 * | 8/2007 | Yake | F16B 33/06 411/111 |
| 7,275,612 | B2 * | 10/2007 | Komura | B60R 16/04 180/68.5 |
| 8,277,158 | B2 * | 10/2012 | Csik | F16B 37/046 411/111 |
| 9,080,592 | B2 * | 7/2015 | Oberndorfer | B21D 39/032 |
| 9,360,039 | B2 * | 6/2016 | Endt | F16B 37/044 |
| 9,422,968 | B2 * | 8/2016 | Thompson | F16B 37/14 |
| 10,156,250 | B2 * | 12/2018 | Hiroi | F16B 37/061 |
| 2003/0147715 | A1 | 8/2003 | Curley, Jr. et al. | |
| 2010/0047037 | A1 | 2/2010 | Ishida et al. | |
| 2010/0270822 | A1 | 10/2010 | Fujitsuka | |

FOREIGN PATENT DOCUMENTS

| | | |
|---|---|---|
| JP | 63-230311 A1 | 9/1988 |
| JP | 64-053611 U | 4/1989 |
| JP | 01-180006 U | 12/1989 |
| JP | 02-098203 U | 8/1990 |
| JP | 07-190035 A1 | 7/1995 |
| JP | 2010-254089 A1 | 11/2010 |
| JP | 2012-017756 A1 | 1/2012 |
| WO | 2004/007978 A2 | 1/2004 |

OTHER PUBLICATIONS

Extended European Search Report (Application No. 16796167.1) dated Jan. 16, 2018.
Chinese Office Action (Application No. 201680004185.0) dated Sep. 28, 2018 (with English translation).

* cited by examiner

ENCASED NUT

BACKGROUND OF THE INVENTION

Field of the Invention

The present invention relates to an encased nut in which a nut is freely movably held inside a case body which is welded to a body.

Description of Related Art

When a slide rail for sliding a seat is fixed to a body of an automobile in a process for manufacturing the automobile, a bolt and a nut are used as fastening members (Patent Literature 1). The nut is attached to the body side. The slide rail is made to abut on the body, and the bolt is then screwed from the slide rail side, whereby fastening is carried out. However, since the shape of the body varies depending on the type of automobile, axial deviation occurs between the bolt and the nut. This causes problems such as deterioration in fastening operability and occurrence of variation in fitting. In order to solve such problems, an encased nut as described, for example, in Patent Literature 2 is used as a fastening member. The encased nut is configured so that a nut is freely movably held inside a case body which is welded to a body. By virtue of this configuration, when the slide rail is fixed to the body, the nut, which is freely movably held, absorbs axial deviation between the bolt and the nut, whereby fastening can be easily carried out.

The body, however, is required to have high corrosion resistance, and thus electrodeposition coating is normally carried out as substrate treatment. When electrodeposition coating is applied in a state where the encased nut is attached to the body side as with conventional cases, current is carried since both of the body and the nut are made of a metal, and an electrodeposition coating material is deposited also on the nut. As a result of this, the nut is disadvantageously affixed to the body and thus is not freely moved.

In order to address this problem, a method including coating a surface of the nut with a resin film for the purpose of insulation is conceivable. However, since the resin film is thin, no sufficient insulating effect can be obtained. Further, the electrodeposition coating material remaining through electrodeposition coating is dried at a high temperature, which causes another problem that the nut is disadvantageously firmly affixed to the body.

CITATIONS LIST

Patent Literature 1: JP 2010-254089 A
Patent Literature 2: JP 1989-53611 U

SUMMARY OF INVENTION

Technical Problems

An objective of the present invention is to provide an encased nut which solves the conventional problems and in which a nut that is freely swingably held inside a case body would not be affixed by electrodeposition coating.

Solutions to Problems

The present invention according to a first aspect, which has been made to solve the above problems, relates to an encased nut including: a case body which is welded to a body; and a nut which is freely movably held inside the case body. The nut is composed of a nut body and an insulating member which is made of a resin and insert-molded on the outer surface of the nut body, and the insulating member is provided with a plurality of protrusions on the side, abutting on the body, of the outer circumferential part.

The present invention according to a second aspect relates to the encased nut according to the first aspect, in which the case body has a bolt hole for inserting a bolt.

The present invention according to a third aspect relates to the encased nut according to the first aspect, in which the insulating member is provided with a resin head part and a resin flange part having the protrusions, and the resin head part is freely movably inserted into a guide hole formed in the body.

The present invention according to a fourth aspect relates to the encased nut according to the third aspect, in which the resin head part has side surfaces which are each in a shape such that the center part is recessed in an axial core direction.

Advantageous Effects of Invention

The encased nut according to the present invention includes a case body that is welded to a body and a nut that is freely movably held inside the case body. This encased nut has been configured so that the nut is composed of a nut body and an insulating member which is made of a resin and insert-molded on the outer surface of the nut body. Hence, the nut body is insulated at the time of electrodeposition coating, thereby making it possible to prevent the nut from being affixed to the body. Further, the insulating member has been configured so as to be provided with a plurality of protrusions on the side, abutting on the body, of the outer circumferential part. Hence, a space part is formed between the insulating member and the body. Since an electrodeposition coating material flows downward from this space part, no liquid pool is generated. Also, the insulating member is brought into point contact with the body, and thus it is made possible to prevent the nut from being firmly affixed to the body after drying at a high temperature, and to easily separate the nut from the body by vibration during use so that the nut can be freely moved inside the case body.

According to the present invention according to the fourth aspect, the respective side surfaces of the resin head part have been configured to be in a shape such that the center part is recessed in an axial core direction. Hence, an electrodeposition coating material discharging pathway formed between each of the side surfaces and the body is made wider, and thus the electrodeposition coating material easily flows downward at the time of electrodeposition coating, so that a liquid pool is less likely to be generated. At the same time, since the contact area between each of the side surfaces and the body is reduced, it is made possible to more effectively prevent firm affixation of the nut to the body after drying at a high temperature.

DETAILED DESCRIPTION OF THE INVENTION

Figure 1:
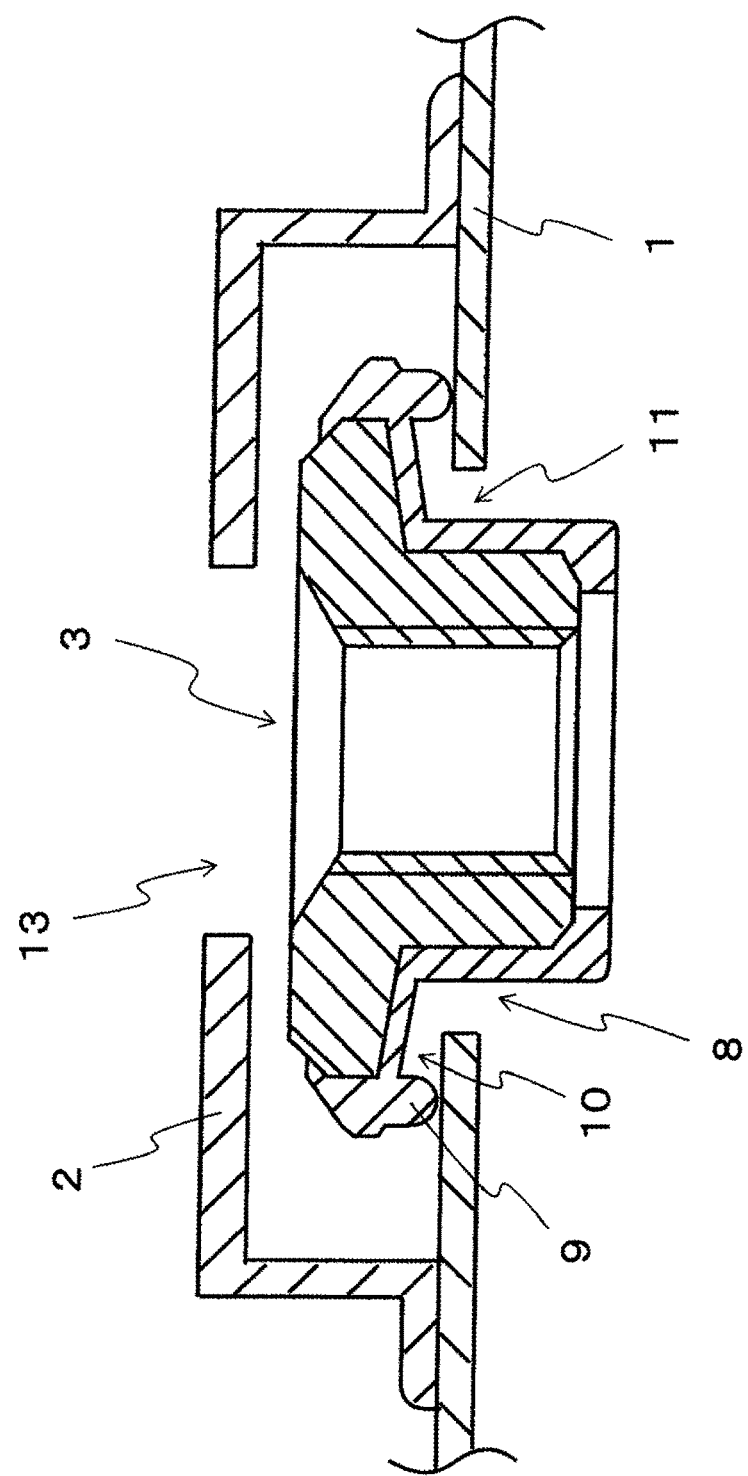
FIG. 1 is a sectional view showing a present embodiment before fastening.
Figure 2:
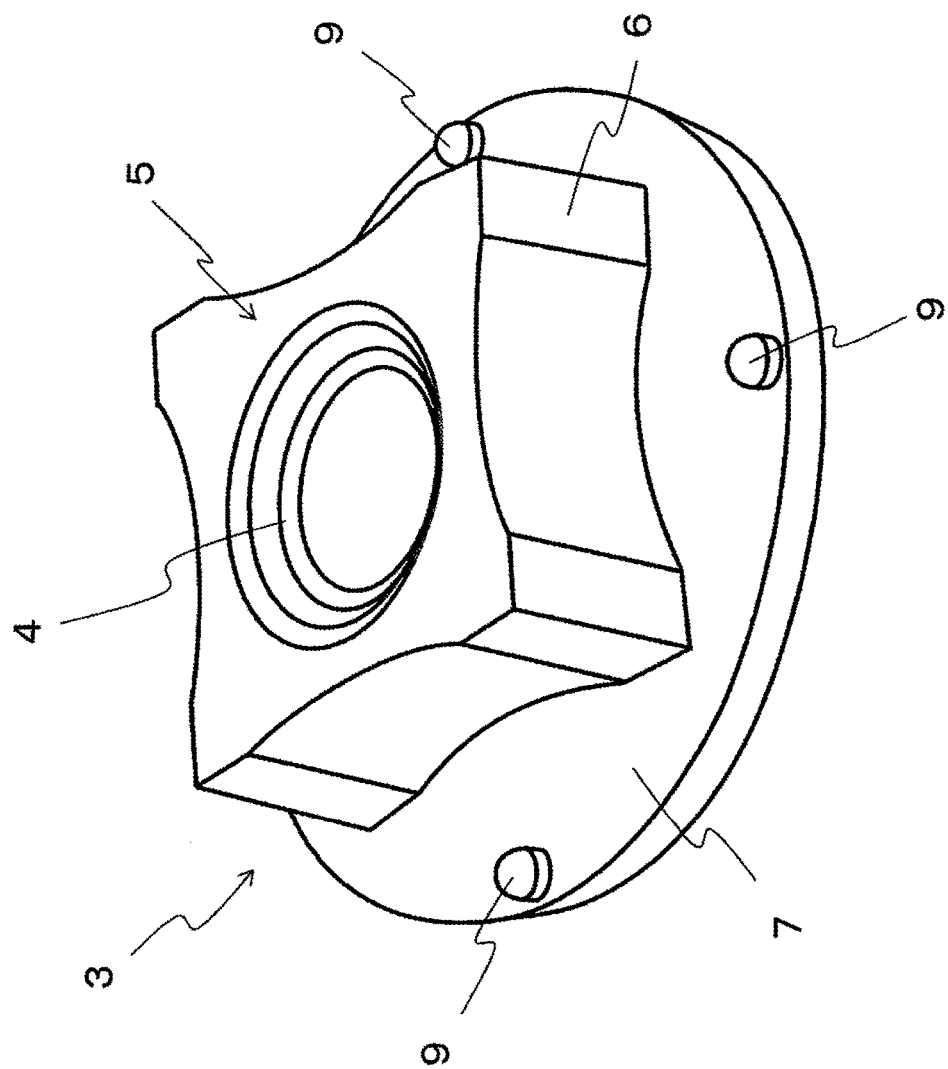
FIG. 2 is a perspective view showing a nut in the present embodiment.
Figure 6:
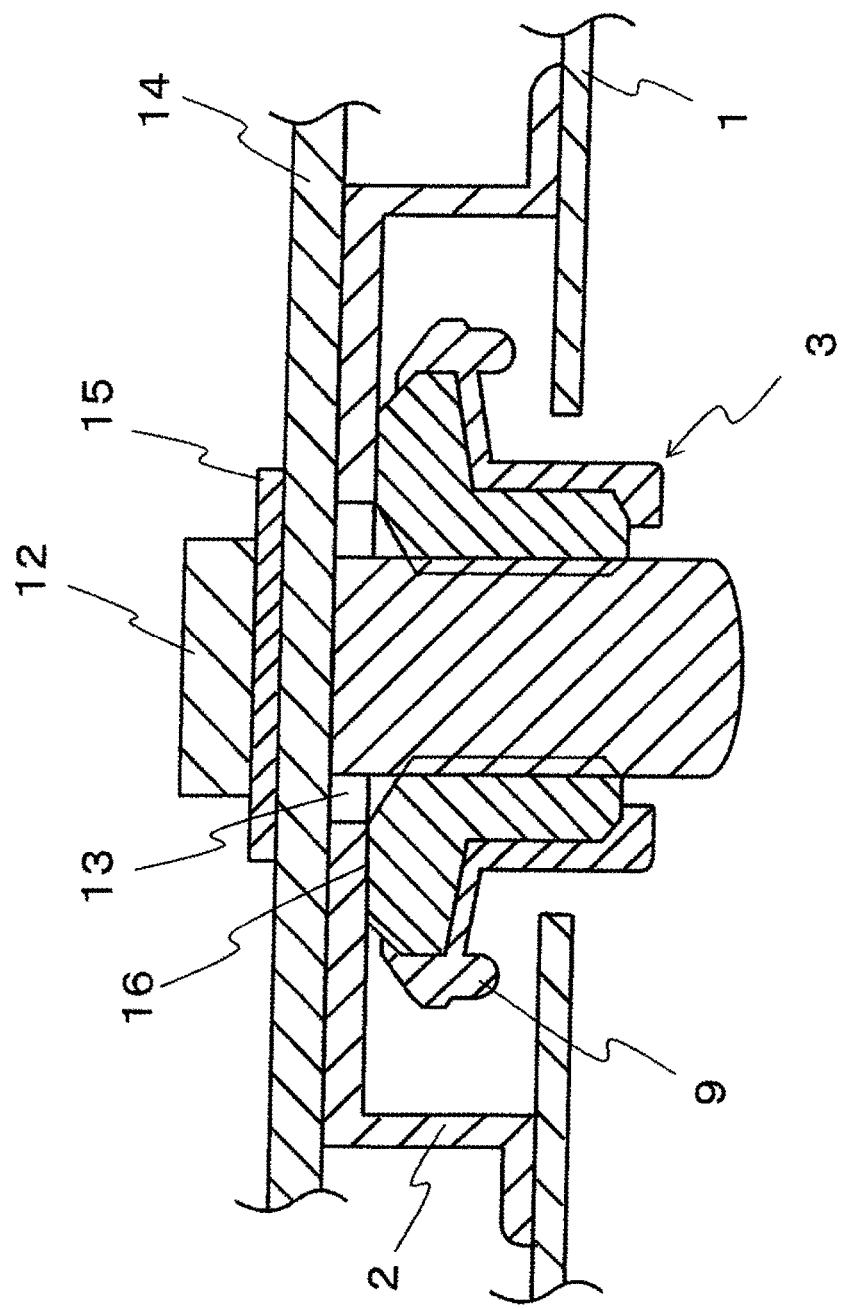
FIG. 6 is a sectional view showing the present embodiment after fastening.

A preferred embodiment of the present invention will be illustrated below. It is noted that an explanation is given about a nut 3 in a state as shown in FIG. 2, and this nut 3 is held inside a case body 2, as shown in FIGS. 1 and 6, in an upside-down state. An encased nut of the present invention includes a case body 2 which is made of a metal and welded to a body 1 of an automobile and a nut 3 which is freely movably held inside this case body 2, as shown in FIG. 1, and electrodeposition coating is applied to the encased nut, as substrate treatment, in the state shown in FIG. 1 in order to enhance the corrosion resistance of the body 1. It is noted that a bolt hole 13 for inserting a bolt 12 is formed in the ceiling surface of the case body 2. Also, the above-mentioned nut 3 has been configured to be composed of a hexagonal nut body 4 which is made of a metal and provided with a flat part 16 on its lower surface and an insulating member 5 which is made of a resin and insert-molded on the outer surface of this hexagonal nut body 4, as shown in FIGS. 2 to 5.

The insulating member 5 is composed of a resin head part 6 which is formed into a quadrangular prism and has a shape such that the respective side surfaces are each in a shape such that the center part is recessed in an axial core direction and a circular resin flange part 7, as shown in FIG. 2. Also, this resin head part 6 has been configured to be freely movably inserted into a guide hole 8 formed in the body 1 as shown in FIG. 1. Further, the encased nut has been configured so that four protrusions 9 having a height of about 1 mm are formed at equal intervals as shown in FIG. 2 on the side, abutting on the body 1 as shown in FIG. 1, of the outer circumferential part of the resin flange part 7. The insulating member 5 is provided on the outer surface of the hexagonal nut body 4 by insert molding in this manner for the purpose of insulation of the nut body 4 at the time of electrodeposition coating, thereby making it possible to prevent the nut 3 from being affixed to the body 1. Further, four protrusions 9, in total, are formed on the side, abutting on the body 1, of the outer circumferential part of the resin flange part 7, so that a space part 10 is formed between the resin flange part 7 and the body 1. The downward flow of the electrodeposition coating material from this space part 10 can prevent the generation of a liquid pool. At the same time, since the protrusions 9 are brought into point contact with the body 1, it is made possible to prevent firm affixation of the nut 3 to the body 1 after drying at a high temperature. Also, the center parts of the respective side surfaces of the resin head part 6 are each recessed in an axial core direction, so that an electrodeposition coating material discharging pathway 11 formed between each of the side surfaces and the body 1, as shown in FIG. 1, is made wider. Therefore, the electrodeposition coating material easily flows downward, and a liquid pool is less likely to be generated. Further, since the contact area between each of the side surfaces and the body 1 is reduced, the nut 3 can be more effectively prevented from being firmly affixed to the body 1 after drying at a high temperature.

It is noted that the height of the above-mentioned protrusions 9 has been defined as about 1 mm in the present embodiment, but is not limited to this so long as an interval which allows downward flow of the electrodeposition coating material is ensured. The number of the protrusions 9 formed is also not limited to this. For example, three protrusions 9 may be formed at equal intervals, so that the contact area between the protrusions 9 and the body 1 can be made smaller. It is noted that the shapes of the resin head part 6 and the resin flange part 7 are also not limited to those of the present embodiment and may appropriately be changed, for example, to a columnar resin head part and a square-shaped resin flange part, depending on the manufacturing process. Further, the insulating member 5 has been configured to be provided on the outer surface of the hexagonal nut body 4 in the present embodiment, but the present invention can be applied also to nut bodies having any other shapes.

In the present embodiment, the insulating member 5 has been configured to be made of nylon 6. This is because nylon 6 has a high melting point of 260° C. and thus the insulating member 5 can withstand high temperatures due to electrodeposition coating. Also, since nylon 6 is a high-strength resin, the insulating member 5 functions as a detent and can withstand repeated fastening and retapping. Further, abnormal noise is normally often generated due to intermetallic contact at the time of fastening. However, since the insulating member 5 is made of nylon 6 as in the present invention, no abnormal noise is generated. It is noted that any material may be used for the insulating member 5 so long as the material has alkali resistance and can withstand electrodeposition coating at 180° C. (i.e., preferably a material having a melting point of 240° C. or more). The insulating member 5 can also be made of polyphenylene sulfide or the like.

The insulating member 5 is made of a resin as described above, thereby making it possible to increase the degree of freedom of molding and to reduce the weight of the insulating member 5. Further, if nuts, which are handled in a relatively complicated manner, are made of a resin, they can advantageously be used without concern for the generation of a scratch or the like.

Figure 3:
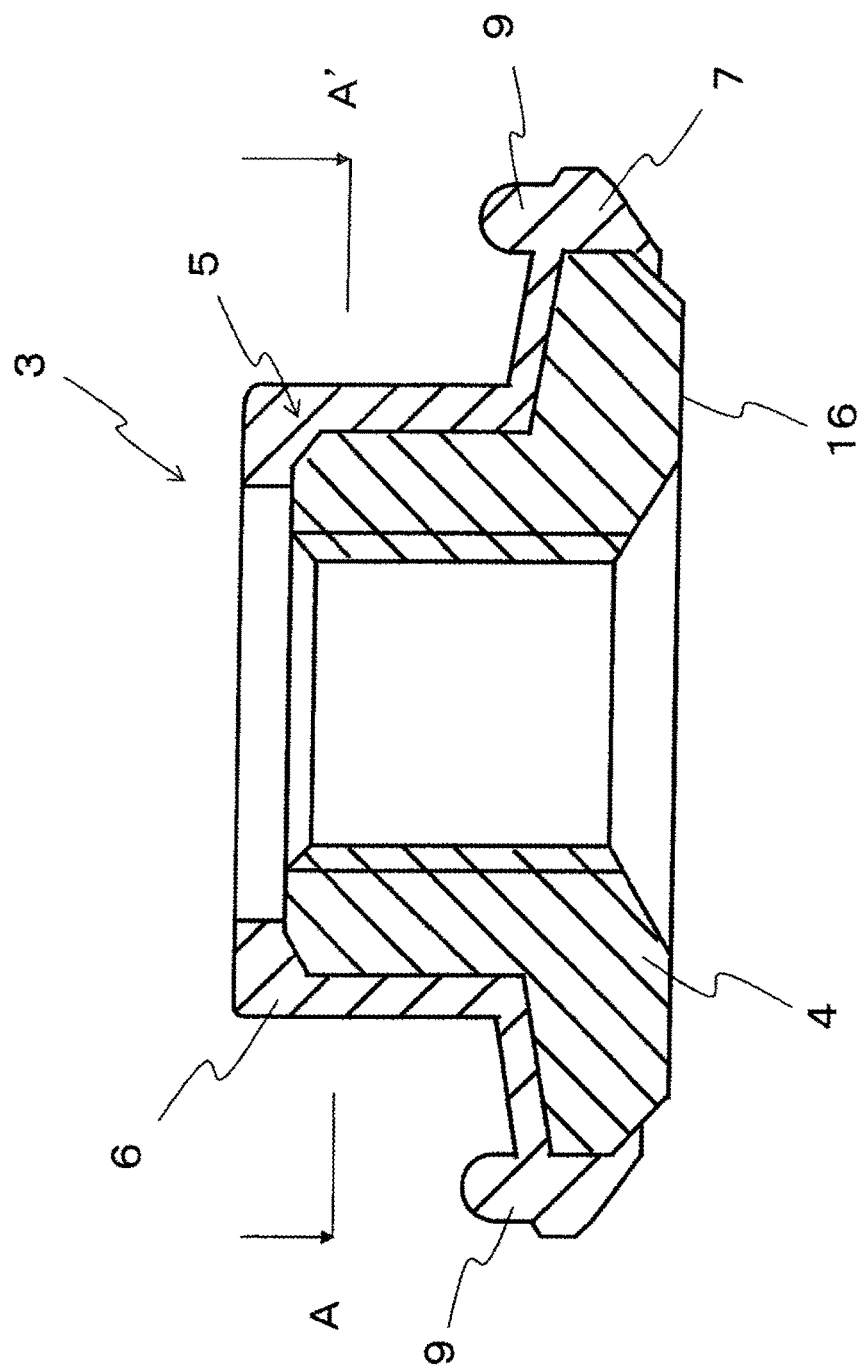
FIG. 3 is a sectional view of the nut shown in FIG. 2.
Figure 4:
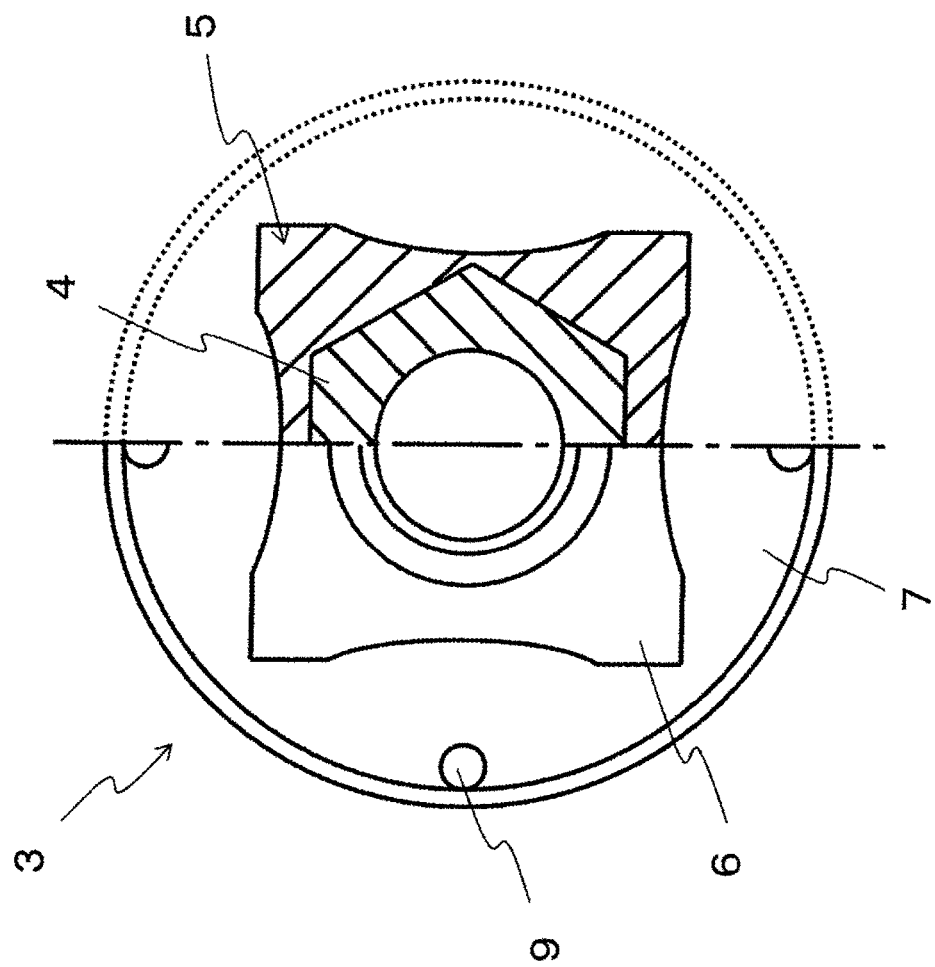
FIG. 4 is a top view showing the nut of the present embodiment and an A-A' sectional view in FIG. 3.
Figure 5:
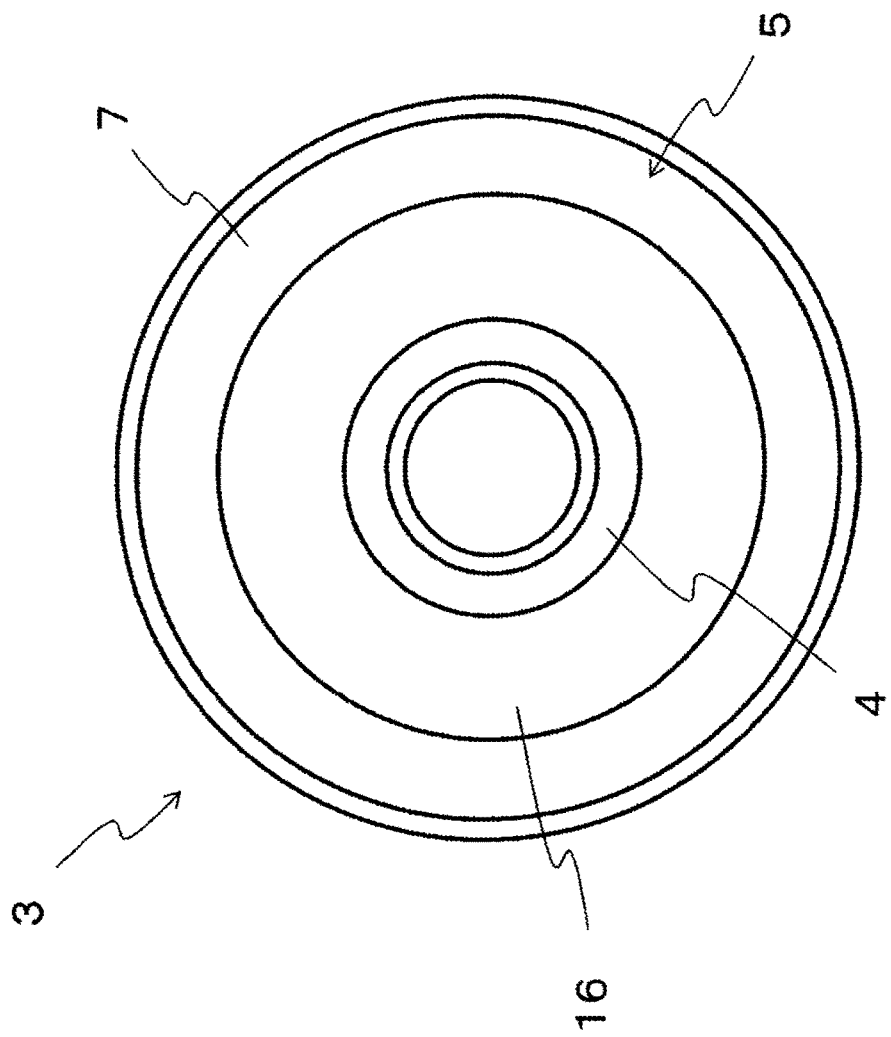
FIG. 5 is a bottom view showing the nut of the present embodiment.

The lower surface side of the outer circumference of the flange part 7 is preferably formed in a tapered shape as shown in FIG. 3, and, by virtue of this shape, the electrodeposition coating material more easily flows downward in FIG. 1.

The use method of the thus-configured encased nut of the present invention will be explained below. Electrodeposition coating is applied in the state shown in FIG. 1. Additionally, since the nut 3 is not firmly affixed to the body 1 even after drying at a high temperature, the nut 3 can be more easily separated from the body 1 by vibration and freely moved inside the case body 2. The bolt 12 is screwed into the hexagonal nut body 4 via a washer 15 in a state where a slide rail 14 abuts on the case body 2 as shown in FIG. 6, whereby the nut 3 is gradually lifted and brought into the after-fastening state shown in FIG. 6. Hence, the nut 3, which is freely movably held inside the case body 2, absorbs axial deviation between the bolt 12 and the nut 3, thereby making it possible to easily fix the slide rail 14 to the body 1.

Also, since the insulating member 5 made of a resin is insert-molded to the outer surface of the hexagonal nut body 4, the reduction in axial force after fastening may occur. Therefore, a step has been provided between a flat part 16 on the lower surface of the hexagonal nut body 4 and the lower surface side of the outer circumference of the flange part 7, as shown in FIG. 3. Thus, after fastening, the ceiling surface of the case body 2 and the flat part 16 of the hexagonal nut body 4 are brought into contact with each other so that intermetallic fastening is carried out, as shown in FIG. 6, thereby making it possible to prevent loosening. It is noted that this flat part 16 preferably has a maximum diameter so as to ensure the amount of lap with the bolt hole 13 even when the axial deviation between the bolt 12 and the nut 3 becomes maximum.

In order that the bolt 12 is easily inserted, the inlet part of the hexagonal nut body 4 is preferably formed in a tapered shape. More preferably, the interval between the nut 3 and the ceiling surface of the case body 2 is set to be the minimum width within a range in which the electrodeposition coating material can flow and the nut 3 can swing, for the purpose of improving the visibility of the nut 3.

REFERENCE SIGNS LIST

1: Body
2: Case body
3: Nut
4: Hexagonal nut body
5: Insulating member
6: Resin head part
7: Resin flange part
8: Guide hole
9: Protrusion
10: Space part
11: Electrodeposition coating material discharging pathway
12: Bolt
13: Bolt hole
14: Slide rail
15: Washer
16: Flat part

The invention claimed is:

1. An encased nut comprising:
a case body which is welded to a body; and
a nut which is freely movably held inside the case body, wherein:
the nut is composed of a nut body and an insulating member which is made of a resin and insert-molded on the outer surface of the nut body; and
the insulating member is provided with a flange part, which is provided with a plurality of protrusions on a side, abutting on the body, of an outer circumferential part.

2. The encased nut according to claim 1, wherein the case body has a bolt hole for inserting a bolt.

3. The encased nut according to claim 1, wherein:
the insulating member is provided with a resin head part and a resin flange part having the protrusions; and
the resin head part is freely movably inserted into a guide hole formed in the body.

4. The encased nut according to claim 3, wherein the resin head part has side surfaces which are each in a shape such that a center part is recessed in an axial core direction.

* * * * *